US008065435B2

(12) United States Patent
Zhou et al.

(10) Patent No.: US 8,065,435 B2
(45) Date of Patent: Nov. 22, 2011

(54) METHOD FOR ASSIGNING ADDRESS TO THE INTELLIGENT INFORMATION HOUSEHOLD APPLIANCE AND THE SUB-EQUIPMENT IN THE HOUSEHOLD NETWORK

(75) Inventors: Jianming Zhou, Beijing (CN); Congxing Ouyang, Beijing (CN); Guanghai Zhang, Beijing (CN); Jinglei Liu, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 174 days.

(21) Appl. No.: 12/302,484

(22) PCT Filed: May 29, 2007

(86) PCT No.: PCT/CN2007/001739
§ 371 (c)(1),
(2), (4) Date: Nov. 25, 2008

(87) PCT Pub. No.: WO2007/143912
PCT Pub. Date: Dec. 21, 2007

(65) Prior Publication Data
US 2009/0182858 A1    Jul. 16, 2009

(30) Foreign Application Priority Data

May 29, 2006  (CN) .......................... 2006 1 0081579
May 29, 2006  (CN) .......................... 2006 1 0081580

(51) Int. Cl.
*G06F 15/16* (2006.01)
*G06F 15/173* (2006.01)

(52) U.S. Cl. ...................... 709/245; 709/224; 709/249
(58) Field of Classification Search .................. 709/223, 709/224, 226, 245, 249; 370/389, 395.53; 705/59
See application file for complete search history.

(56) References Cited

U.S. PATENT DOCUMENTS 6,006,261 A * 12/1999 Ratcliff et al. ................. 709/224
6,496,862 B1 * 12/2002 Akatsu et al. ................. 709/224
(Continued)

FOREIGN PATENT DOCUMENTS
CN    1437814 A    8/2003
(Continued)

OTHER PUBLICATIONS

Katsuno, Y.; Aihara, T.; , "Autonomic network configuration for networkable digital appliances," Consumer Electronics, IEEE Transactions on , vol. 51, No. 2, pp. 494-500, May 2005.*

*Primary Examiner* — Aaron Strange
(74) *Attorney, Agent, or Firm* — Fay Kaplun & Marcin, LLP (57) ABSTRACT

A method for allocating addresses to intelligent information appliances and their subordinate devices is provided. The network side of a household network sends down-link broadcast message, triggering intelligent information appliances newly connected to the network to return device connection information containing its MAC address to the network side. Alternatively, a newly connected information appliance sends broadcast message carrying device connection information to the network side. After the host at the network side receives the device connection information, the host allocates and stores an unused data bus address for the intelligent information appliance. The network side implements the allocation of data bus addresses to the intelligent information appliances by establishing corresponding relation between intelligent information appliances' MAC addresses and respective data bus addresses, without the need of using other higher layer protocols. The method allows simplifying the protocol stacks, turning the intelligent information appliance in the household network into an external device of the host in the household network, which is invisible to external networks, thus greatly improving safety of the household network, reducing complexity of the appliance, and reducing cost of the appliance.

14 Claims, 6 Drawing Sheets

U.S. PATENT DOCUMENTS

| | | | |
|---|---|---|---|
| 6,611,525 B1 * | 8/2003 | Natanson et al. | 370/395.53 |
| 6,658,517 B1 | 12/2003 | Niimi et al. | 710/305 |
| 6,977,939 B2 * | 12/2005 | Joy et al. | 370/401 |
| 7,428,586 B2 * | 9/2008 | Sutherland et al. | 709/224 |
| 2003/0037166 A1 | 2/2003 | Ueno et al. | |
| 2004/0098504 A1 | 5/2004 | Ueno et al. | |
| 2005/0197965 A1 * | 9/2005 | Takabayashi et al. | 705/59 |
| 2006/0067317 A1 * | 3/2006 | Engstrand et al. | 370/389 |
| 2007/0073882 A1 * | 3/2007 | Brown et al. | 709/226 |
| 2008/0288704 A1 * | 11/2008 | Diab et al. | 710/305 |

FOREIGN PATENT DOCUMENTS

| | | |
|---|---|---|
| CN | 1476201 A | 2/2004 |
| CN | 1213570 C | 8/2005 |
| EP | 1 265 405 A1 | 12/2002 |
| JP | 2001-28601 A | 1/2001 |
| JP | 2001-53925 A | 2/2001 |
| JP | 3359594 B2 | 10/2002 |
| KR | 2002-0079785 A | 10/2002 |
| WO | 02054682 A1 | 7/2002 |

\* cited by examiner

METHOD FOR ASSIGNING ADDRESS TO THE INTELLIGENT INFORMATION HOUSEHOLD APPLIANCE AND THE SUB-EQUIPMENT IN THE HOUSEHOLD NETWORK

FIELD OF THE INVENTION

The present invention relates to a method for allocating an address to a device. In particular, the present invention relates to a method for allocating addresses to intelligent information appliances and subordinate devices in a household network through active query at the household network side.

BACKGROUND OF THE INVENTION

With the development of network technologies and information appliance industries, the originally purely functional household appliances can now exchange data with a network. This type of household appliance, which can exchange information with a network, is called information appliance, or networking appliance. An information appliance can receive data from a network, and return its status information to the network. The birth of information appliances enables a user to use the Internet to obtain the data of information appliances in a household, so that the user can monitor the status of the information appliances without going back home. Amidst these, there are some simple electrical appliances that only have a few logical functions, and these simple electrical appliances are called logical information appliances, such as electrical lamps, electrically controlled faucets, etc. These logical information appliances only need to receive some simple logical control commands (such as switch on and switch off), and to return status information (such as the status of the switch); thus complex information exchange is not necessary for these logical information appliances. Apart from these logical information appliances, there are also intelligent information appliances. An intelligent information appliance has more functions, thus typically requiring relatively complex information exchange and data processing. Intelligent information appliances include television, microwave, refrigerator, and compound devices with hub, etc.

Figure 1:
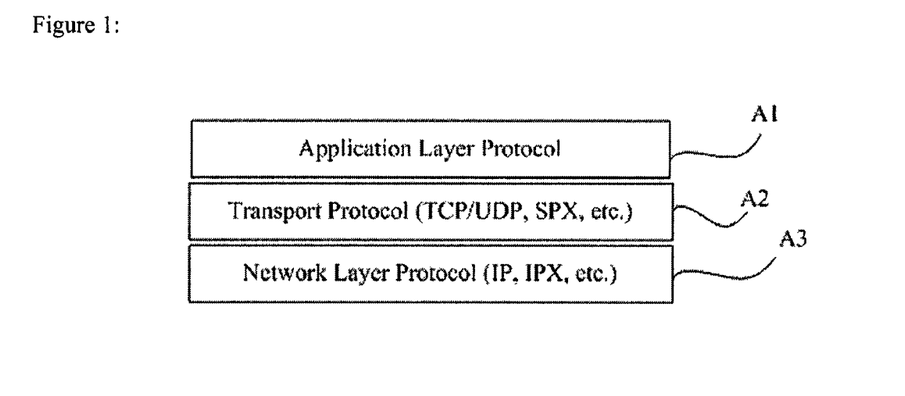
FIG. 1 is a schematic illustration of a protocol stack in the prior art.

The device address finding and coding protocols of current household networks are shown in FIG. 1. The protocol stack includes TCP/IP transport protocol A2 and network layer protocol XML templates-based SOAP etc. By publishing various URL addresses for its device information and service information etc., a device provides access path for other devices, thus allowing service functions to be provided.

In current household networks, although the names and usage of various coding protocols are different, most of these coding protocols use the XML syntax as their coding syntax.

Current technical schemes discussed above have the following disadvantages:

1. For existing household network protocol stacks, most of them use TCP/IP protocol stack. The IP network itself can not guarantee to provide strong safety insurance, hence higher protocols are needed in order to meet various safety demands, thus increasing the complexity of the protocols.

2. A household network is different from any network mode in the past. It penetrates into the various aspects of a user's family life, thus the user must hope that the network is safe and easy to use for all members in the family, and the network can not be accessed by other people or other people's devices outside the family. However, the structure of household networks is based on TCP/IP. Information appliances in these networks have IP addresses, so that a household network with a small local area network (LAN) can be connected to the Internet. The information appliances in this household network can access the Internet, while devices outside of the household network can also access these information appliances, which is very dangerous for the user if these devices are not the user's mobile terminals. If these information appliances can be accessed from the outside of the household network, private information of the user may be leaked. If external malicious information can reach the inside of the household network, the safety of the user's family is threatened.

3. The protocol stacks of current existing household networks often emphasize the real-time discovery of devices, but this discovery is based on an entire set of discovery mechanism of the IP protocol stack. Once devices mutually discover each other, they can communicate to each other independently. Since information appliances usually feature this kind of communication and mutual operation capabilities, some operations do not have to go through a home gateway, which leads to weakened management capability of the home gateway managing a digital household.

4. Current existing household networks all emphasize the intelligence of information appliances. In order to implement mutual discovery and service rendering of devices, each device not only needs to publish its information, but also needs to keep a service information list of other devices, thus increasing the cost of these appliances.

5. Current existing household networks mainly use IPv4 addresses. In the future application of household networks, the large amount of connected information appliances will inevitably meet the limitation of the limited IPv4 address resource. A household network may then use a mapping between IPv4 addresses and IPv6 addresses, or upgrade to IPv6 addresses, but both of the above solutions will bring unnecessary troubles to the user.

SUMMARY

In view of the disadvantages of the conventional technology, the purpose of the present invention is to provide a method for allocating addresses to intelligent information appliances and their subordinate devices in a household network, in order to simplify the protocol stacks in existing household networks. Intelligent information appliances in the household network are enabled to communicate with external networks through a main processing module of a host device (shortened as "host", such as a home gateway), so that the intelligent information appliances are invisible to external networks, effectively screening safety threats from external networks, increasing safety of household networks, and reducing cost of appliances.

The present invention provides an address allocation method for an intelligent information appliance in a household network, comprising:

Step 1, an intelligent information appliance sends a broadcast message that carries a Media Access Control (MAC) address of the intelligent information appliance;

Step 2, after the broadcast message is received by an adapter unit in a home gateway, the adapter unit stores the MAC address of the intelligent information appliance, converts the broadcast message into a data bus signal that carries device connection information, and sends the data bus signal to a main processing module on a main board in the home gateway;

Step 3, after the main processing module receives the data bus signal, the main processing module sends a data bus signal containing an unused data bus address to the adapter unit;

Step 4, the adapter unit stores the unused data bus address, encapsulates a data bus signal that carries the unused data bus address in an unicast message that carries the MAC address of the main processing module, and sends the unicast message to the intelligent information appliance according to the previously stored MAC address of the intelligent information appliance;

Step 5, after the intelligent information appliance receives the unicast message, the intelligent information appliance analyzes the message to obtain the MAC address of the main processing module and the unused data bus address, and stores the MAC address of the main processing module and the unused data bus address, then returns an acknowledgment message to the adapter unit;

Step 6, the adapter unit stores the previously stored unused data bus address and the MAC address of the intelligent information appliance into a mapping list used for recording the mapping relation between data bus addresses and MAC addresses, then the adapter unit returns a data bus signal that carries an acknowledgment message to the main processing module;

Step 7, after the main processing module receives the acknowledgment message, the main processing module stores the unused data bus address into a data bus address list marked as "Used"; and Step 8, the process terminates.

The main processing module allocates data bus address for the intelligent information appliance through the adapter unit, and the adapter unit sends the MAC address of the main processing module to the intelligent information appliance, thus the intelligent information appliance connected to the household network only uses the MAC address of the main processing module as the destination address to send a message, so that the intelligent information appliance only communicates with the main processing module, without communicating to other appliances. All intelligent information appliances in the household network are connected to the main processing module in the host device, thus external networks must go through the main processing module of the host device in order to communicate with information appliances in the household network, effectively screening safety threats from external networks, while at the same time improving the management capability of the host managing intelligent information appliances. Since the system only needs to allocate data bus addresses to the intelligent information appliances, the problem of limited IP address resource does not exist.

In the above technical scheme, the intelligent information appliance can use power line communication (PLC) carrier mode and/or wireless mode and/or Category 5 cable mode to connect to the adapter unit.

The main processing module can use USB protocol and/or 1394 protocol or other data bus protocol to communicate with the adapter unit, hence in Step 2, the adapter unit can convert the broadcast message into a USB signal or a 1394 data bus signal that carries device connection information; in Step 3, the main processing module can send a USB signal containing an unused USB address, or send a 1394 signal containing an unused 1394 data bus address, to the adapter unit; in Step 4, the adapter unit stores the USB address or the 1394 data bus address, and encapsulates a USB signal carrying the unused USB address or encapsulates a 1394 signal carrying the unused 1394 address, into a unicast message; in Step 6, the adapter unit stores the stored unused USB address or unused 1394 data bus address and the MAC address into the mapping list; in Step 7, the main processing module stores the unused USB address or the unused 1394 data bus address into a USB address list or a 1394 address list marked as "Used".

As an embodiment of the present invention, after the adapter unit receives the broadcast message, the adapter unit searches the mapping list for the received MAC address of the intelligent information appliance, if the MAC address is found, then terminates the process without any further processing, or alternatively converts the broadcast message into a data bus signal and sends the data bus signal to the main processing module, then terminates the process. If the search result is empty, then the adapter unit stores the MAC address of the intelligent information appliance. Thus the possibility of repeatedly allocating data bus addresses to a connected intelligent information appliance is avoided. Since the main processing module's MAC address stored in a reconnected intelligent information appliance may be deleted, after the adapter unit finds out the MAC address of the intelligent information appliance, before the entire process is terminated, a message containing the MAC address of the main processing module is sent to the intelligent information appliance.

As another embodiment of the present invention, when the adapter unit is processing the broadcast message, an intelligent information appliance already connected to the adapter unit decides whether or not the source MAC address in the broadcast message is the same as the stored MAC address of the main processing module; if they are the same, then it receives the broadcast message; otherwise, it discards the broadcast message. This thus prevents broadcast messages sent by newly connected intelligent information appliances from interfering other already connected intelligent information appliances, effectively stopping the mutual communication between information appliances. Since the intelligent information appliances no longer communicate with each other, an intelligent information appliance does not need to keep a service information list of other intelligent information appliances, reducing the cost of appliances.

The present invention further provides an address allocation method for an intelligent information appliance in a household network, comprising:

Step 1', a network side sends a down-link broadcast message containing a MAC address of a host at the network side; ("Network side" used in the embodiments of the present invention means the network side of a household network (or "the household network side"). The household network side is the side where the host device is set. Relative to the household network side, the device side of a household network is the side where the intelligent information appliances are set.)

Step 2', after an intelligent information appliance is connected to the network, the intelligent information appliance receives the down-link broadcast message;

Step 3', the intelligent information appliance analyzes the down-link broadcast message, obtains the MAC address of the host;

Step 4', the intelligent information appliance stores the MAC address, and uses the MAC address as the destination address to send device connection information containing a MAC address of the intelligent information appliance to the network side;

Step 5', the network side sends data bus allocation information containing an unused data bus address for the intelligent information appliance, and stores the MAC address of the intelligent information appliance and the data bus address; and Step 6', after the intelligent information appliance receives the data bus allocation information, the intelligent information appliance stores the data bus address.

By establishing corresponding relation between intelligent information appliances' MAC addresses and data bus addresses, the network side implements data bus address allocation for intelligent information appliances. Furthermore, the network side does not need to use protocols of other higher layers, thus simplifying the protocol stacks, turning the intelligent information appliances in the household network into an external device of the host in the household network. The intelligent information appliances are invisible to external networks, greatly improving safety of the household network, reducing complexity of the appliances, thus reducing cost of the appliances.

The present invention also provides an address allocation method for a subordinate device of an intelligent information appliance in a household network, comprising:

Step 1", after a subordinate device is plugged into an intelligent information appliance, device connection information is sent to a household network side;

Step 2", after the household network side receives the device connection information, an unused data bus address is sent to the intelligent information appliance;

Step 3", the intelligent information appliance sends the data bus address to the subordinate device, the subordinate device stores the data bus address;

Step 4", the intelligent information appliance returns an acknowledgment message to the household network side; and Step 5", the household network side stores the data bus address into a mapping list of intelligent information appliances' MAC addresses and data bus addresses.

The data bus address allocation for subordinate devices of intelligent information appliances is implemented without the need of using other higher layer protocols, thus simplifying the protocol stacks, turning the intelligent information appliances in the household network into external devices of the host in the household network. The intelligent information appliances are invisible to external networks, greatly improving safety of the household network, reducing complexity of the devices, thus reducing cost of the devices.

The technical scheme of the present invention is further illustrated in detail through drawings and embodiments below.

DETAILED DESCRIPTION OF THE EMBODIMENTS

Figure 3:
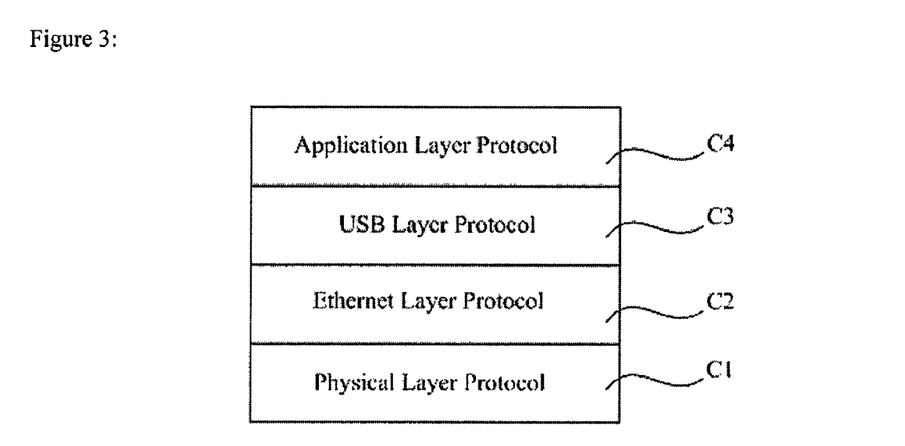
FIG. 3 is a schematic illustration of a protocol stack used in an address allocation method for an intelligent information appliance in a household network according to an embodiment of the present invention.

The communication protocol stack of a home gateway system usually takes the form shown in FIG. 3, which comprises a physical layer protocol C1 as the bottom layer, an Ethernet protocol C2 as the next higher layer, a data bus protocol such as the USB protocol C3 as the third layer, and an application protocol C4 as the highest layer. For the physical layer C1, various connection modes can be used, such as PLC carrier mode, wireless mode, Category 5 cable mode etc., or any combination of these connection modes. The physical layer C1 is used for connecting an intelligent information appliance to an adapter unit. The USB protocol C3 is preferably used as the data bus protocol in one embodiment. The Ethernet layer is mainly used to adapt the low level information and USB protocol layer C3 information to Ethernet information, hide the technical details used by the lower layer from the higher layer, and accomplish some address finding functions based on Ethernet MAC addresses. The USB layer mainly provides plug-and-play function to devices, and the ability to exchange information between various intelligent information appliances and a host device (shortened as a "host", such as a home gateway). The application layer mainly provides richer service information and reliable communication security.

The Ethernet that we are familiar with usually implements the correct message transmission by completing an IP address mapping using existing ARP or SARP address analysis technique. However, for a home gateway system which is a non-IP network, it is necessary to complete a mapping between an Ethernet MAC address and a USB layer address, or even a mapping in the higher layers.

Figure 2:
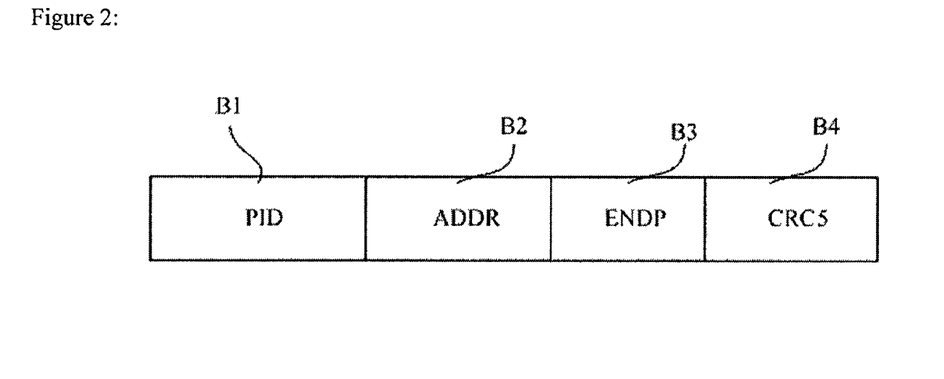
FIG. 2 is a schematic illustration of the format of a USB labeled packet in an address allocation method for an intelligent information appliance in a household network according to an embodiment of the present invention.

The USB layer uses a certain packet format to implement the information exchange between a host device application program and a designated peripheral device. FIG. 2 shows a marked packet format which comprises a PID field B1, an ADDR field B2, an ENDP field B3 and a CRCS field B4. The PID field B1 has 8 bits, and may belong to one of the following four types: marking, data, handshaking and dedicated. The marking field (i.e. PID field B1) can only be sent by the control module of a host, for connecting peripheral devices, indicating input/output directions, etc. The address field (i.e. ADDR field B2) has 7 bits, thus a maximum number of 127 USB peripheral devices can be connected. The ENDP field B3 indicates the port number on an intelligent information appliance, so that a host may conveniently and flexibly perform address look-up when the host needs to communication with one or more ports, while supporting a maximum number of 16 ports. The CRCS field B4 ensures the correctness of the address and port fields.

Figure 5:
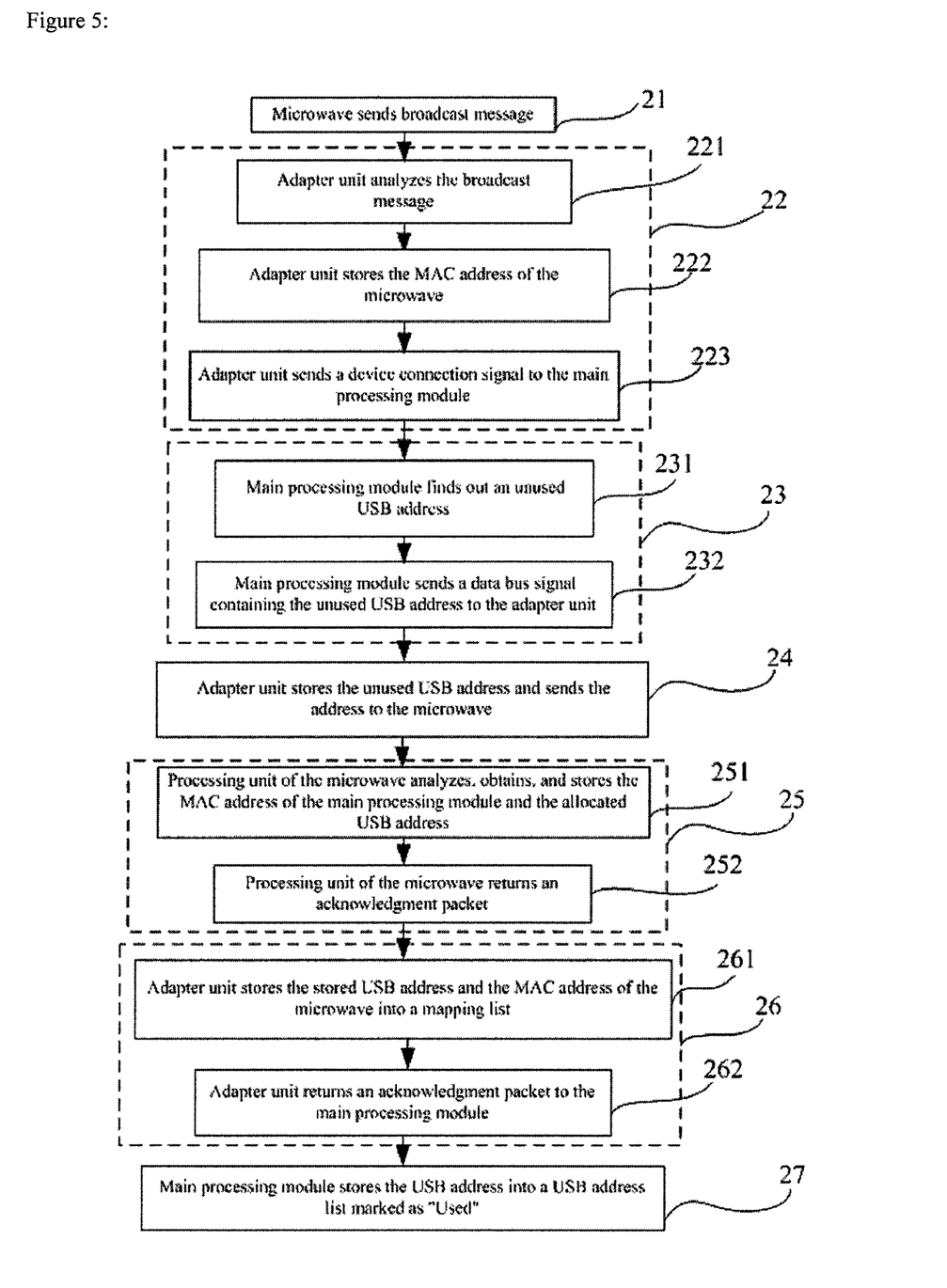
FIG. 5 is a flowchart of an address allocation method for intelligent information appliance in a household network, according to another embodiment of the present invention.

In view of the USB marked packet format described above, the present invention proposes setting up a mapping list of USB addresses and MAC addresses in a host device. When the host device needs to communicate with an intelligent information appliance, it may look up the mapping list to obtain the MAC address of the intelligent information appliance, thus the unicast is implemented in the MAC layer. Furthermore, based on practical needs, a multicast mode for some intelligent information appliances can also be implemented. A detailed embodiment is shown in FIG. 5.

Figure 4:
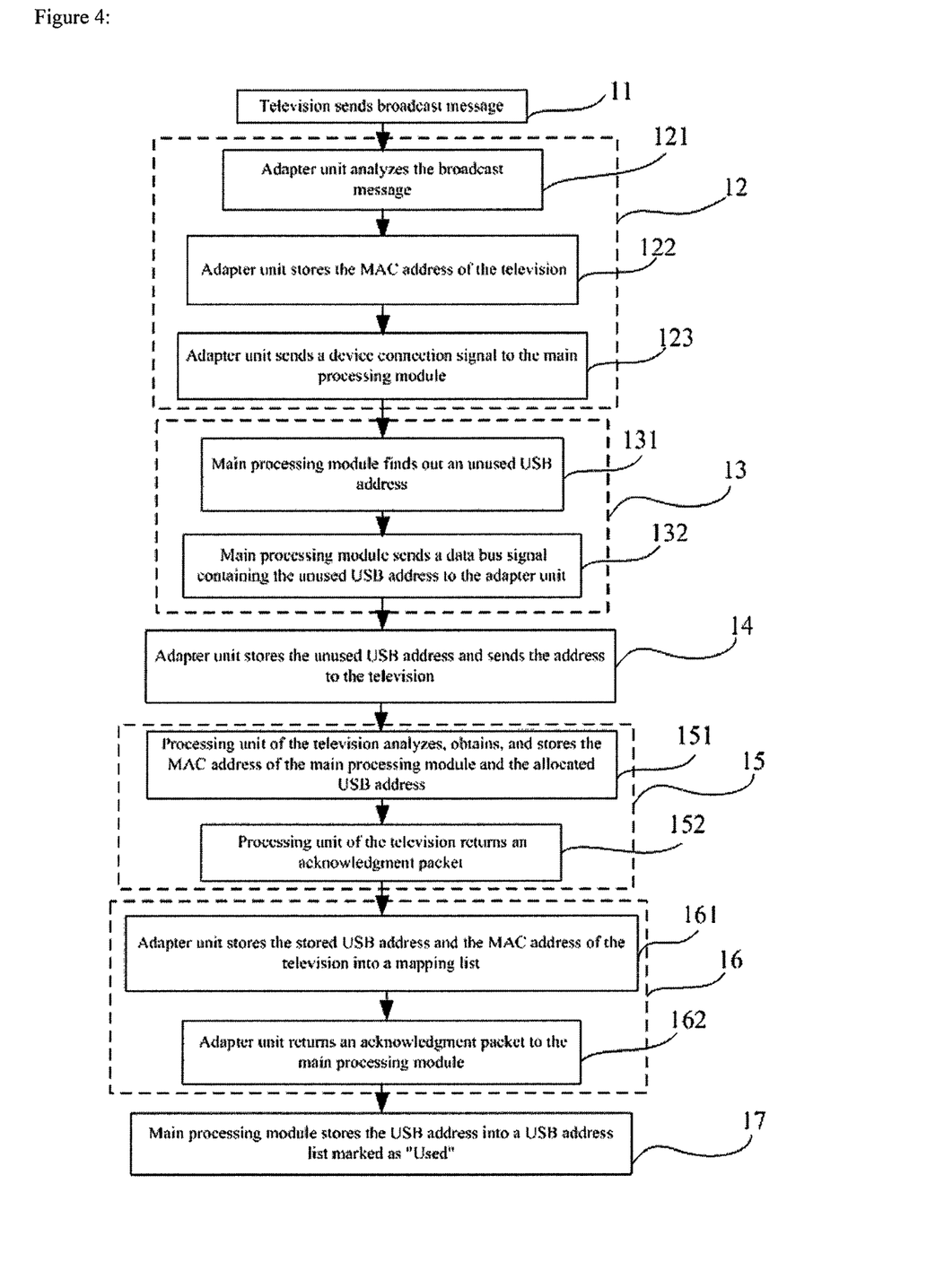
FIG. 4 is a flowchart of an address allocation method for an intelligent information appliances in a household network, according to an embodiment of the present invention.

FIG. 4 is a flowchart of an address allocation method for an intelligent information appliance in a household network, according to an embodiment of the present invention. The method comprises:

Step 11, an intelligent information appliance sends a broadcast message that carries a MAC address of the intelligent information appliance; for example, when a home gateway is running properly, if a new intelligent information appliance, such as a television, is joining this home gateway, the television automatically sends a broadcast message (including Ethernet up-link broadcast message) that carries a MAC address of the television after a power line of the television is plugged into a power socket; the broadcast message is transmitted through the power line to a PLC filter; the broadcast message is then demodulated by a PLC modulation/demodulation unit in the PLC filter in order to obtain an Ethernet signal; this Ethernet signal is then sent to an adapter unit;

Step 12, after the broadcast message is received by the adapter unit, the adapter unit stores the MAC address of the intelligent information appliance, converts the broadcast message into a data bus signal that carries device connection information, and sends the data bus signal to a main processing module;

The Step 12 of this embodiment further comprises:

Step 121, after the broadcast message is received by the adapter unit, the adapter unit decides the destination address is the up-link broadcast address and the source address is the MAC address of the television, by analyzing a frame head of the broadcast message;

Step 122, the adapter unit stores the MAC address of the television;

Step 123, the adapter unit sends a data bus signal of device connection to a main processing module of the host device.

In case the television is frequently turned on and off, it is possible that the adapter unit does not have enough time to delete the MAC address of the television during the time period when the television is turned off, then the main processing module may reallocate a new data bus address (such as a USB address) to the television when it is turned on. In order to prevent repeatedly allocating USB addresses to the same MAC address, the adapter unit needs to look up this MAC address in an existing MAC address list. If the MAC address exists in the MAC address list, then it terminates the process and uses the previously allocated data bus address, or it sends a data bus signal for the television's reconnection to the main processing module and terminates the process. Under normal circumstances, when the television is frequently turned on and off, the MAC address of the main processing module stored in the television will not be deleted, but in order to prevent the MAC address from being accidentally deleted, a data bus signal containing the MAC address of the main processing module may be sent to the television before terminating the process. If the MAC address of the television does not exist in the mapping list, then the MAC address is appearing for the first time, thus the MAC address is stored and a data bus signal for USB device connection is sent to the main processing module of the host device. Under normal circumstances, since the messages sent by a connected intelligent information appliance are unicast messages, it is not necessary to perform the look-up.

If it is possible that an intelligent information appliance already connected to the host may also receive a broadcast message sent by a newly joined intelligent information appliance, then the already connected intelligent information appliance firstly decides whether or not the source MAC address in the broadcast message is the same as the stored MAC address of the main processing module. If they are the same, then the already connected intelligent information appliance receives the broadcast message. If they are different, then the already connected intelligent information appliance discards the broadcast message. Hence mutual communication between information appliances is effectively prevented, and the information appliances are universally controlled by the host device.

Step 13, after the main processing module receives the data bus signal, the main processing module sends a data bus signal, which contains an unused data bus address, to the adapter unit; in one embodiment, Step 13 comprises:

Step 131, after the main processing module of the host device detects a device connection signal, which means a new device is joining, the main processing module obtains an unused USB address;

Step 132, the main processing module sends a data bus signal, which contains the unused USB address, to the adapter unit.

Step 14, the adapter unit stores the unused data bus address (e.g., the USB address) in the data bus signal (e.g., the USB signal) into a cache, encapsulates the data bus signal (e.g., the USB signal) in an Ethernet frame by using the Ethernet address of the host as the source address and the stored MAC address of the television as the destination address, and sends out the Ethernet frame as a unicast message;

Step 15, after the intelligent information appliance receives the unicast message, it analyzes the message to obtain and store the MAC address of the main processing module and the allocated USB address, then returns an acknowledgment message to the adapter unit; in one embodiment, Step 15 comprises:

Step 151, when the Ethernet frame encapsulating the USB signal therein reaches the television through the power line, a processing unit in the television analyzes the Ethernet frame and obtains the USB signal from the main processing module, and then obtains and stores the MAC address of the main processing module and the allocated USB address; and Step 152, the processing unit of the television returns an acknowledgment packet to the adapter unit.

Step 16, the adapter unit stores the previously stored unused data bus address and the MAC address of the intelligent information appliance into a mapping list, which is used for recording the mapping relation between data bus addresses and MAC addresses, then the adapter unit returns a data bus signal that carries an acknowledgment message to the main processing module; in one embodiment, Step 16 comprises:

Step 161, after the adapter unit receives the acknowledgment packet, the adapter unit stores the previously stored USB address and the MAC address of the television into a mapping list of data bus addresses and MAC addresses; and Step 162, the adapter unit returns an acknowledgment packet to the main processing module, informing, through a USB signal, the main processing module that the allocation of the USB address for the television has been completed.

Step 17, after the main processing module receives the acknowledgment message, the main processing module stores the unused data bus address into a data bus address list marked as "Used"; for example, after the main processing module of the host device receives the message indicating that the USB address allocation has been completed, the main processing module stores the USB address into the data bus address list marked as "Used".

Now the host device has used the main processing module to allocate a data bus address for the television through the adapter unit, so that the host device can obtain some simple configuration information of the television and know from an external network server what kind of detailed services are provided by this television, so that a user in the household can use the host device to obtain such information. Furthermore, if the user is outside of the household, he/she can use an external network server and a home gateway (i.e., a host device) to achieve the goal of controlling the television.

FIG. 5 is a flowchart of an address allocation method for an intelligent information appliance in a household network, according to another embodiment of the present invention. This embodiment uses a microwave as an example, and the method comprises:

Step 21, when a home gateway is running properly, after a microwave is connected to an adapter unit of a host device through a Category 5 cable, the microwave automatically sends a broadcast message (including Ethernet up-link broadcast message) that carries a MAC address of the microwave, and transmits the broadcast message to the adapter unit through the Category 5 cable;

Step 22, the adapter unit analyzes the broadcast message to obtain and store the MAC address of the microwave, and sends a device connection signal to a main processing module; Step 22, in one embodiment, comprises:

Step 221, after the adapter unit receives the broadcast message, the adapter unit decides the destination address is the up-link broadcast address and the source address is the MAC address of the microwave by analyzing a frame head of the broadcast message;

Step 222, the adapter unit stores the MAC address of the microwave; and

Step 223, the adapter unit sends a data bus signal of device connection to the main processing module of the host device.

In case the microwave is frequently turned on and off, it is possible that the adapter unit does not have enough time to delete the MAC address of the microwave during the time period when the microwave is turned off, then the main processing module may reallocate a new data bus address (such as a USB address) to the microwave when it is turned on. In order to prevent repeatedly allocating USB addresses to the same MAC address, the adapter unit needs to look up this MAC address in an existing MAC address list. If the MAC address exists in the MAC address list, then it terminates the process and uses the previously allocated data bus address, or it sends a data bus signal for the microwave reconnection to the main processing module and terminates the process. Under normal circumstances, when the power supply of an intelligent information appliance is frequently plugged and pulled, the MAC address of the main processing module stored in the appliance will not be deleted, but in order to prevent the MAC address from being accidentally deleted, a data bus signal containing the MAC address of the main processing module may be sent to the intelligent information appliance before terminating the process. If the MAC address of the microwave does not exist in the mapping list, then the MAC address is appearing for the first time, thus the MAC address is stored and a data bus signal for USB device connection is sent to the main processing module of the host device. Under normal circumstances, since the messages sent by a connected intelligent information appliance are unicast messages, it is not necessary to perform the look-up.

If an intelligent information appliance, such as a television, is already connected to the host, and may also receive a broadcast message sent by a newly joined microwave, then the television firstly decides whether or not the source MAC address in the broadcast message is the same as the MAC address of the main processing module stored by the television. If they are the same, then the television receives the broadcast message. If they are different, then the television discards the broadcast message. Hence mutual communication between the television and the microwave is effectively prevented, and the television and the microwave are universally controlled by the host device.

Step 23, the host device encapsulates an unused USB address into a data bus signal, and sends the data bus signal to an adapter unit; Step 23, in one embodiment, comprises:

Step 231, after the main processing module of the host device detects a device connection signal, which means a new device is joining, the main processing module obtains an unused USB address; and Step 232, the main processing module sends a data bus signal, which contains the unused USB address, to the adapter unit.

Step 24, the adapter unit stores the unused USB address in the data bus signal into a cache, encapsulates the data bus signal in an Ethernet frame by using the Ethernet address of the host as the source address and the stored MAC address of the microwave as the destination address, and sends out the Ethernet frame;

Step 25, the processing unit of the microwave analyzes, obtains and stores the MAC address of the main processing module and the USB address allocated by the main processing module, then returns an acknowledgment packet; Step 25, in one embodiment, comprises:

Step 251, the Ethernet frame encapsulating the USB signal therein reaches the microwave through the Category 5 cable, the processing unit of the microwave analyzes the Ethernet frame and obtains the USB signal from the main processing module, and then obtains and stores the MAC address of the main processing module and the USB address; and Step 252, the processing unit of the microwave returns an acknowledgment packet to the adapter unit.

Step 26, the adapter unit stores the previously stored USB address and the MAC address of the microwave into a mapping list, and returns an acknowledgment packet to the main processing module; Step 26, in one embodiment, comprises:

Step 261, after the adapter unit receives the acknowledgment packet, the adapter unit stores the previously stored USB address and the MAC address of the microwave into a mapping list of data bus addresses and MAC addresses; and Step 262, the adapter unit returns an acknowledgment packet to the main processing module, informing, through a USB signal, the main processing module that the allocation of the USB address for the microwave has been completed.

Step 27, after the main processing module of the host device receives the message indicating that the USB address allocation has been completed; the main processing module stores the USB address into a data bus address list marked as "Used".

Now the host device has used the main processing module to allocate a data bus address for the microwave through the adapter unit, the host device can obtain some simple configuration information of the microwave and know from an external network server what kind of detailed services are provided by this microwave, so that a user in the household can use the host device to obtain these information. Furthermore, if the user is outside of the household, he/she can use an external network server and a home gateway (i.e., a host device) to achieve the goal of controlling the microwave It should be noted that if the intelligent information appliance is a compound device comprising a hub, then the data bus address allocated to the intelligent information appliance by the main processing module is actually allocated to the hub in the compound device.

The data bus protocol used in the present invention can be, for example, the USB protocol, the 1394 protocol, etc. The USB protocol is used here in the illustrated embodiments.

Figure 6:
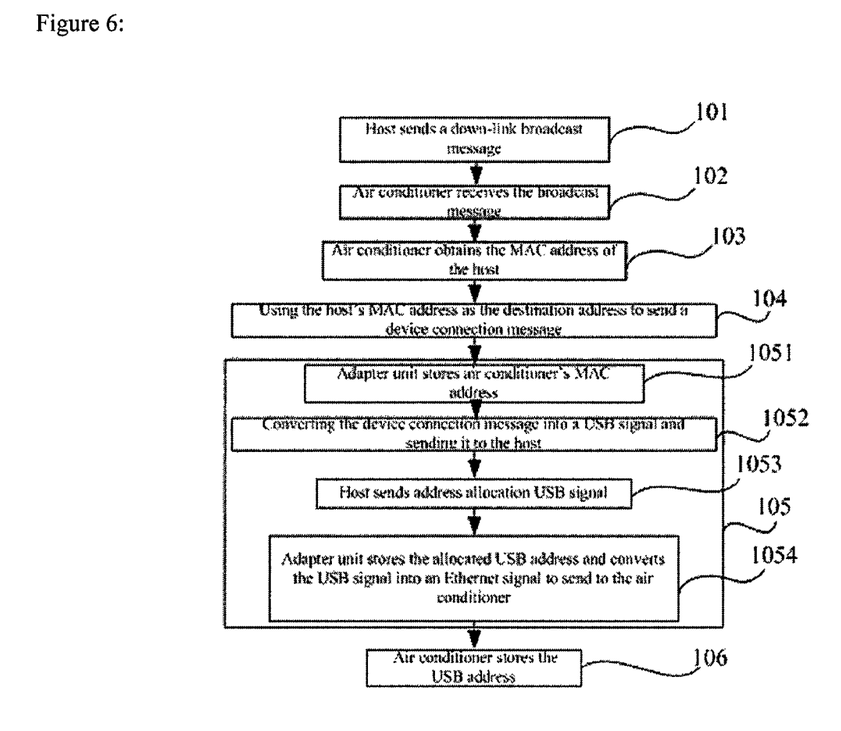
FIG. 6 is a flowchart of an address allocation method for an intelligent information appliance in a household network, according to yet another embodiment of the present invention.

FIG. 6 is a flowchart of an address allocation method for an intelligent information appliance in a household network, according to yet another embodiment of the present invention. Assuming an air conditioner is connected to a household network, the air conditioner obtains an address through the following process:

Step 101, a network side sends a down-link broadcast message which contains a MAC address of a host at the network side; an embodiment provided by the present invention includes: the host at the network side periodically sends an Ethernet broadcast frame to the household network system, where the source address contained in a frame head of the frame is the MAC address of the host, the destination address is a self-defined MAC address for the down-link broadcast from the host to the device;

Step 102, after an intelligent information appliance is connected to the network, the appliance receives the down-link broadcast message; for example, if an air conditioner is powered on to be connected to the household network, then the air conditioner will receive the broadcast frame sent down by the host;

Step 103, the intelligent information appliance analyzes the down-link broadcast message, obtains the MAC address of the host; for example, the air conditioner obtains the MAC address of the host from the broadcast frame;

Step 104, the intelligent information appliance stores the MAC address, and uses the MAC address as the destination address to send device connection information containing a MAC address of the intelligent information appliance to the network side; for example, after the air conditioner obtains the MAC address of the host, the air conditioner uses the MAC address of the host as the destination address to send the device connection information, the device connection information is an Ethernet frame containing a MAC address of the air conditioner.

In order to prevent repeatedly allocating addresses to the same device, after the network side receives the device connection information, the network side may use a previously stored MAC address list to decide whether or not the MAC address of the intelligent information appliance exists. If the MAC address exists, then it terminates the process. If the MAC address does not exist, then Step 105 is executed.

Step 105, the network side sends data bus allocation information containing an unused USB address for the intelligent information appliance and stores the MAC address of the intelligent information appliance and the USB address; in one embodiment of the present invention, Step 105 comprises:

Step 1051, an adapter unit at the network side stores the MAC address of the intelligent information appliance such as an air conditioner;

Step 1052, the adapter unit converts the device connection information into a USB signal, and returns the USB signal to the host at the network side;

Step 1053, after the host receives the USB signal, the host sends an address allocation USB signal, which contains an unused USB address, to the adapter unit; and Step 1054, after the adapter unit receives the address allocation USB signal, the adapter unit stores the unused USB address, encapsulates the address allocation USB signal into an Ethernet frame, and sends the Ethernet frame to the intelligent information appliance.

Step 106, after the intelligent information appliance, such as the air conditioner, receives the data bus allocation information, the intelligent information appliance stores the USB address.

Now, the intelligent information appliance, such as the air conditioner, has obtained a data bus address, so that the intelligent information appliance acts as an external device of the host in the household network, thus reducing the complexity of the device, hence reduces the cost.

Figure 7:
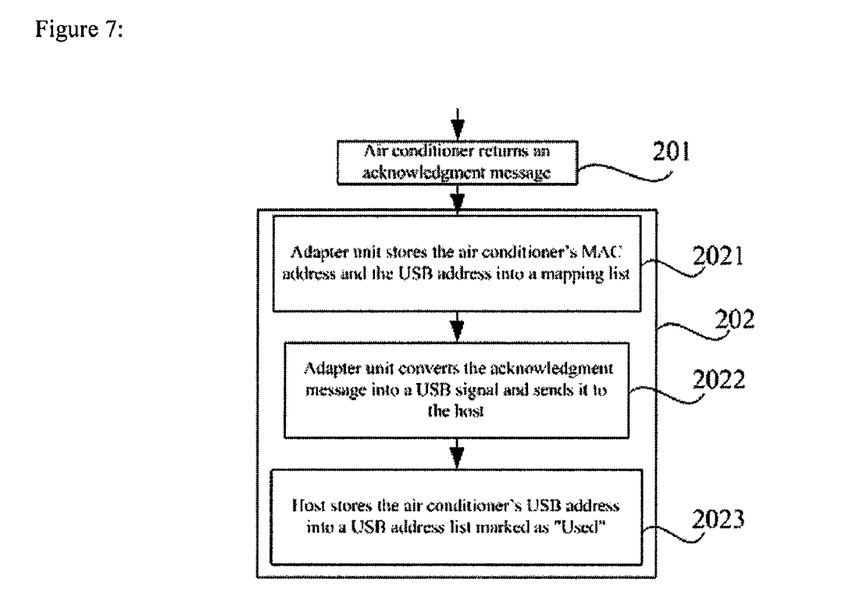
FIG. 7 is part of a flowchart of an address allocation method for an intelligent information appliance in a household network, according to yet another embodiment of the present invention.

Furthermore, in order to improve the management capability of a host which managing intelligent information appliances in an entire household network, the present invention provides yet another embodiment. The first six steps of the method in this embodiment are the same as in FIG. 6; hence detailed description is not needed. As shown in FIG. 7, the method in this embodiment further comprises:

Step 201, after the intelligent information, such as the air conditioner, obtains the USB address, the air conditioner returns an acknowledgment message to the network side;

Step 202, after the network side receives the acknowledgment message, the USB address is passed to and stored in a mapping list of intelligent information appliances' MAC addresses and USB addresses; in one embodiment of the present invention, Step 202 comprises:

Step 2021, after the adapter unit receives the acknowledgment message, the adapter unit stores the stored MAC address of the intelligent information appliance such as the air conditioner, as well as the USB address allocated to the intelligent information appliance, into a mapping list of MAC addresses and USB addresses;

Step 2022, the adapter unit converts the acknowledgment message into a USB message, and returns the USB message to the host; and Step 2023, the host stores the USB address allocated to the intelligent information appliance into a USB address list marked as "Used".

The present invention further improves the management capability of the network side host in managing intelligent information appliances, by establishing a mapping relationship between intelligent information appliances' MAC addresses and USB addresses at the network side. Furthermore, the data bus protocol and the Ethernet protocol are used to simplify the protocol stacks and hide the internal network from the external networks, ensuring the safety of the home gateway system.

For a compound device that comprises a hub, if a subordinate device such as a mouse or a keyboard is plugged into the hub, then apart from allocating an address for the compound device using the above method, the subordinate device of the compound device also needs to be allocated with an address. The process is described in detail in the following embodiment.

Figure 8:
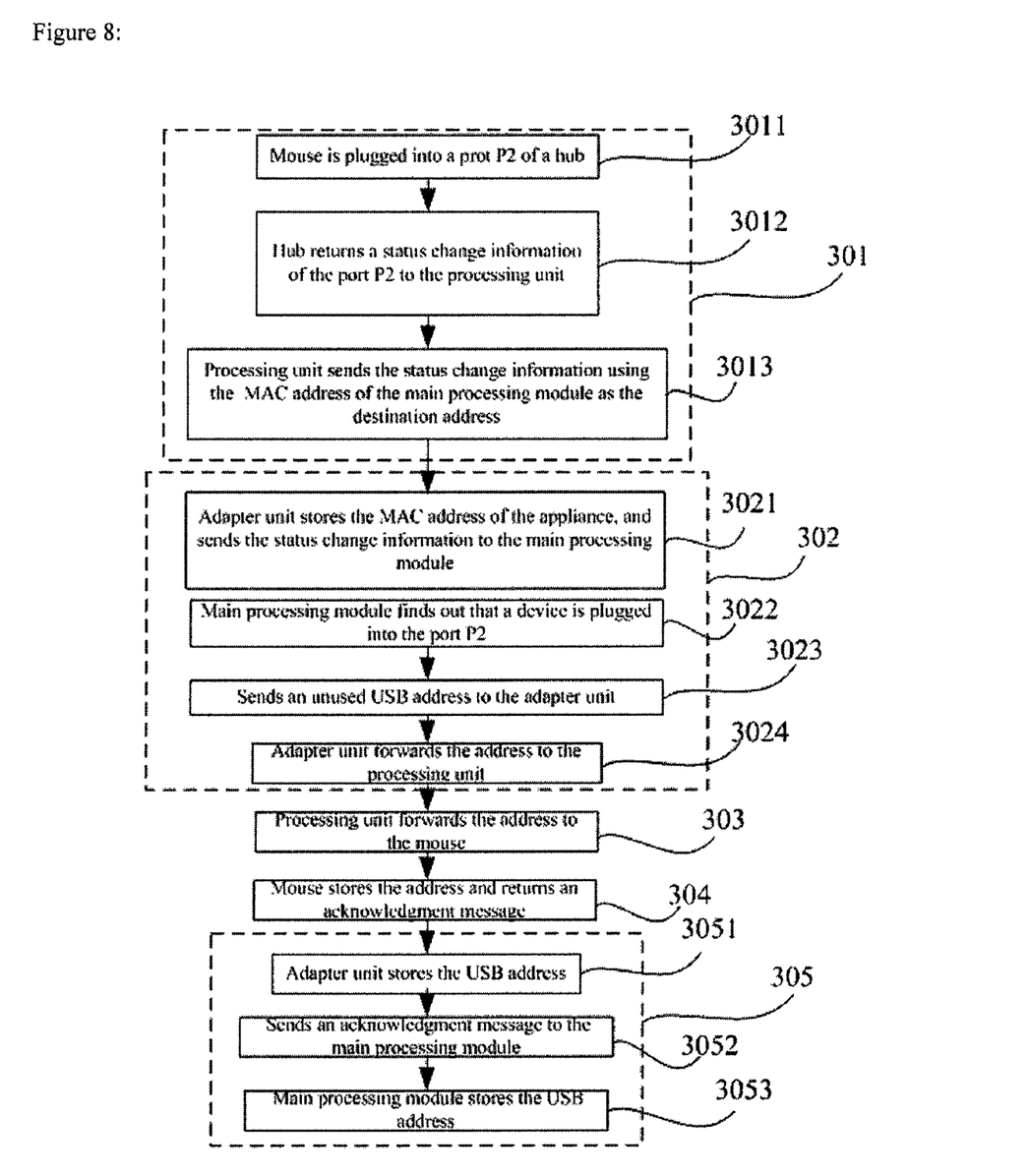
FIG. 8 is a flowchart of an address allocation method for a subordinate device of an intelligent information appliance in a household network, according to an embodiment of the present invention.

FIG. 8 is a flowchart of an address allocation method for a subordinate device of an intelligent information appliance in a household network, according to an embodiment of the present invention. The method comprises:

Step 301, after a subordinate device is plugged into an intelligent information appliance, device connection information is sent to a household network side; in one embodiment of the present invention, Step 301 comprises:

Step 3011, after a subordinate device such as a mouse is plugged into a port such as P2 of a hub in an intelligent information appliance, the hub records a status change information of the port P2;

Step 3012, after the hub receives reading information sent by the household network side through a processing unit of the intelligent information appliance, the status change information of the port P2 is returned to the processing unit of the intelligent information appliance; and Step 3013, after the processing unit receives the status change information of the port P2, the status change information of the port P2 and the MAC address of the intelligent information appliance are encapsulated into an Ethernet frame; the Ethernet frame is then sent by using a previously stored MAC address of the main processing module of the household network side as the destination address.

Step 302, after the household network side receives the device connection information, an unused data bus address is sent to the intelligent information appliance; in one embodiment of the present invention, Step 302 comprises:

Step 3021, after an adapter unit of the network side receives the Ethernet frame, the MAC address of the intelligent information appliance is stored, the Ethernet frame is then encapsulated as a data bus message, and sent to the main processing module;

Step 3022, the main processing module analyzes the data bus message, finds out that a device is plugged into a port P2 of the hub;

Step 3023, the main processing module sends a data bus message, which contains an unused data bus address, to the adapter unit; and Step 3024, the adapter unit stores the data bus address in the data bus message sent by the main processing module, encapsulates the data bus message into an Ethernet frame, and sends the Ethernet frame to the processing unit.

Step 303, the intelligent information appliance sends the data bus address to the subordinate device, the subordinate device stores the data bus address; in the preferred embodiment of the present invention, Step 303 comprises: the processing unit converts the Ethernet frame that contains the unused data bus address into a data bus message, and sends the data bus message to the subordinate device through the hub;

Step 304, the intelligent information appliance returns an acknowledgment message to the household network side; in the preferred embodiment of the present invention, Step 304 comprises: after the subordinate device receives the data bus message containing the unused data bus address, the subordinate device stores the unused data bus address, and returns an acknowledgment message to the adapter unit through the hub and the processing unit;

Step 305, the household network side stores the unused data bus address into the mapping list of intelligent information appliances' MAC addresses and data bus addresses; in one embodiment of the present invention, Step 305 comprises:

Step 3051, after an adapter unit at the household network side receives the acknowledgment message, the unused data bus address and the intelligent information appliance's MAC address are correspondingly stored into a mapping list of data bus addresses and MAC addresses;

Step 3052, the adapter unit sends the acknowledgment message to the main processing module; and Step 3053, the main processing module stores the unused data bus address into a data bus address list marked as "Used".

Now, the subordinate device of the intelligent information appliance has obtained the data bus address allocated by the household network side, and has become an peripheral device of the host in the household network, thus improving the management capability of the host in the household network, making intelligent information appliances in the household network invisible to external networks, improving the safety of the household network, and reducing the cost.

Figure 9:
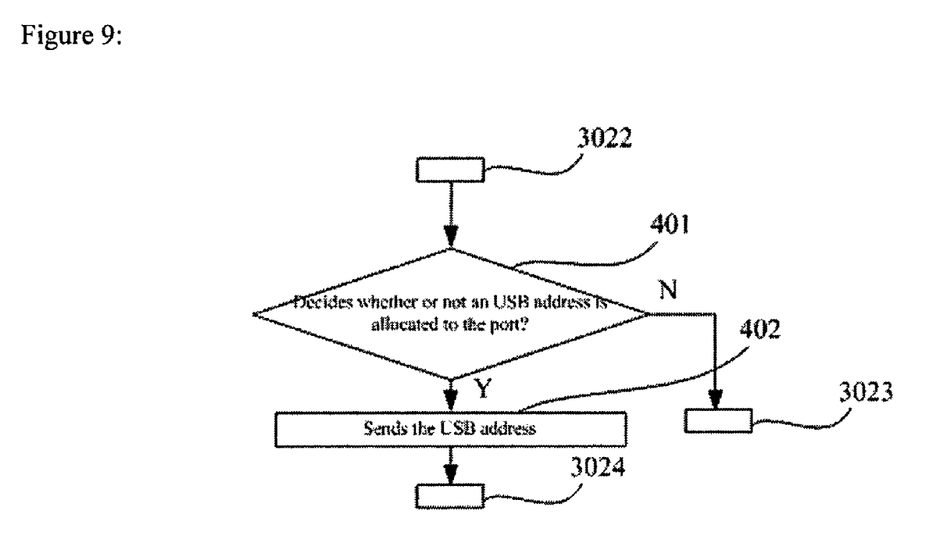
FIG. 9 is a flowchart of an address allocation method for a subordinate device of an intelligent information appliance in a household network, according to another embodiment of the present invention.

However, under the circumstance where a subordinate device is quickly and repeatedly plugged and pulled, the household network side may fail to delete the address record of the device. Hence another embodiment is provided, as shown in FIG. 9. According to one embodiment, the following steps are added between Step 3022 and Step 3023 in FIG. 8, while the rest of the steps for the embodiment are the same as the steps in FIG. 8, thus those steps are not described in detail:

Step 401, the main processing module uses the previously stored mapping list of hub ports and data bus addresses to decide whether or not a data bus address has been allocated to the port into which the subordinate device is plugged; if "yes", then execute Step 402, otherwise execute Step 3023;

Step 402, the main processing module sends a data bus message, which contains the data bus address allocated to the port into which the subordinate device is plugged, to the adapter unit; execute Step 3024, now the data bus address appeared in Step 3024, Step 305, Step 3051, Step 3052 and Step 3053 is a data bus address in the "Used" list, and Step 3053 can be omitted.

It should be noted that the above embodiments are only used to describe the technical solutions of the present invention, and they are not used to impose any restriction or limit to the present invention. Despite the present invention having been elaborately described in reference to the above embodiments, it should be understood by a person skilled in the art: it is still possible to modify the technical solutions described in the above embodiments, or replace part of the technical features with equivalent ones, while these modifications and replacements do not detach the essence of corresponding technical solutions from the spirit and scope of the technical solutions described in each embodiment of the present invention.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

What is claimed is:

1. An address allocation method for intelligent information appliances in a household network, the method comprising:
   (a), sending by an intelligent information appliance a broadcast message that carries the MAC address of the intelligent information appliance;
   (b), after the broadcast message is received by an adapter unit, storing by the adapter unit the MAC address of the intelligent information appliance, converting by the adapter unit the broadcast message into a computer bus signal that carries device connection information, and sending by the adapter unit the computer bus signal to a computer bus main processing module;
   (c), after the computer bus main processing module receives the computer bus signal, sending by the computer bus main processing module a computer bus signal containing an unused computer bus address to the adapter unit;

(d), storing by the adapter unit the unused computer bus address, encapsulating by the adapter unit the computer bus signal that carries the unused computer bus address in a unicast message that carries the MAC address of the computer bus main processing module, and sending by the adapter unit the unicast message to the intelligent information appliance according to the previously stored MAC address of the intelligent information appliance;

(e), after the intelligent information appliance receives the unicast message, analyzing by the intelligent information appliance the message to obtain the MAC address of the computer bus main processing module and the unused computer bus address, and storing by the intelligent information appliance the MAC address of the computer bus main processing module and the unused computer bus address, then returning by the intelligent information appliance an acknowledgment message to the adapter unit;

(f), storing by the adapter unit the previously stored unused computer bus address and the MAC address of the intelligent information appliance into a mapping list used for recording the mapping relation between computer bus addresses and MAC addresses, then returning by the adapter unit a computer bus signal that carries an acknowledgment message to the computer bus main processing module;

(g), after the computer bus main processing module receives the acknowledgment message, storing by the computer bus main processing module the unused computer bus address into a computer bus address list marked with a particular mark; and (h), dependent upon the mapping list, the intelligent information appliance functioning as an external device of the computer bus main processing module communicates with the computer bus main processing module by using a computer bus protocol.

2. The method of claim 1, wherein during said (b), after the adapter unit receives the broadcast message, before the MAC address of the intelligent information appliance is stored, said (b) further comprises:
searching by the adapter unit the mapping list for the received MAC address of the intelligent information appliance;
if the MAC address is found, then terminating, or converting by the adapter unit the broadcast message into a computer bus signal and sending the computer bus signal to the computer bus main processing module, then terminating; and
if the search result is empty, then storing by the adapter unit the MAC address of the intelligent information appliance.

3. The method of claim 2, wherein during said (b), after the adapter unit finds the MAC address and before the entire process is terminated, a message containing the MAC address of the computer bus main processing module is returned by the adapter unit to the intelligent information appliance.

4. The method of claim 1, wherein when said (b) is being executed, intelligent information appliances connected to the adapter unit decide whether or not the source MAC address in the broadcast message is same as the stored MAC address of the computer bus main processing module; if they are the same, then said intelligent information appliances receive the broadcast message, and otherwise, discard the broadcast message.

5. An address allocation method for intelligent information appliances in a household network, the method comprising:
a1, sending by a network side a down-link broadcast message containing a MAC address of a host at the network side;
a2, after an intelligent information appliance is connected to the network, receiving by the intelligent information appliance the down-link broadcast message;
a3, analyzing by the intelligent information appliance the down-link broadcast message, and obtaining the MAC address of the host;
a4, storing by the intelligent information appliance the MAC address of the host, and using the MAC address of the host as a destination address to send device connection information containing a MAC address of the intelligent information appliance;
a5, sending by the network side computer bus allocation information containing an unused computer bus address for the intelligent information appliance, and storing the MAC address of the intelligent information appliance and the computer bus address;
a6, after the intelligent information appliance receives the computer bus allocation information, storing by the intelligent information appliance the computer bus address;
a61, returning by the intelligent information appliance an acknowledgment message to the network side;
a62, after the network side receives the acknowledgment message, storing by the network side the stored computer bus address and the MAC address of the intelligent information appliance into a mapping list used for recording the mapping relation between computer bus addresses and MAC addresses; and
a63, dependent upon the mapping list, the intelligent information appliance functioning as an external device of the host communicates with the host by using a computer bus protocol.

6. The method of claim 5, wherein during said a1, the host at the network side periodically sends the down-link broadcast message to the household network system.

7. The method of claim 5, wherein between said a4 and said a5, the method further comprises:
after the network side receives the device connection information, using by the network side a previously stored MAC address list to decide whether or not the MAC address of the intelligent information appliance exists; if the MAC address exists, then terminating, otherwise, executing said a5.

8. The method of claim 5, wherein said a5 comprises:
a51, storing by an adapter unit at the network side the MAC address of the intelligent information appliance;
a52, converting by the adapter unit the device connection information into a computer bus signal, and returning the computer bus signal to the host at the network side;
a53, after the host receives the computer bus signal, sending by the host an address allocation computer bus signal containing an unused computer bus address to the adapter unit; and
a54, after the adapter unit receives the address allocation computer bus signal, storing by the adapter unit the unused computer bus address, encapsulating by the adapter unit the address allocation computer bus signal into an Ethernet frame, and sending by the adapter unit the Ethernet frame to the intelligent information appliance.

9. The method of claim 5, wherein said a62 comprises:
a71, after the adapter unit receives the acknowledgment message, storing by the adapter unit the stored computer bus address and the MAC address of the intelligent information appliance into the mapping list used for recording the mapping relation between computer bus addresses and MAC addresses;
a72, converting by the adapter unit the acknowledgment message into a computer bus message, and returning by the adapter unit the computer bus message to the host; and
a73, storing by the host the computer bus address into a computer bus address list marked with a particular mark.

10. An address allocation method for subordinate devices of intelligent information appliances in a household network, the method comprising:
b1, after a subordinate device is plugged into an intelligent information appliance, sending device connection information to a computer bus main processing module at the household network side of the household network;
b2, after the computer bus main processing module at the household network side receives the device connection information, sending an unused computer bus address to the intelligent information appliance;
b3, sending by the intelligent information appliance the computer bus address to the subordinate device, wherein the subordinate device stores the computer bus address;
b4, returning by the intelligent information appliance an acknowledgment message to the household network side;
b5, storing by the household network side the computer bus address into a mapping list of intelligent information appliances' MAC addresses and computer bus addresses; and
b6, dependent upon the mapping list, the intelligent information appliance functioning as an external device of the computer bus main processing module communicates with the computer bus main processing module by using a computer bus protocol.

11. The method of claim 10, wherein said b1 comprises:
b11, after a subordinate device is plugged into a port of a hub in an intelligent information appliance, recording by the hub the status change information of the port;
b12, after the hub receives reading information sent by the household network side through a processing unit of the intelligent information appliance, returning the status change information to the processing unit of the intelligent information appliance; and
b13, after the processing unit receives the status change information, encapsulating the status change information and the MAC address of the intelligent information appliance into an Ethernet frame, and then sending the Ethernet frame using the stored MAC address of the computer bus main processing module of the household network side as the destination address.

12. The method of claim 11, wherein said b2 comprises:
b21, after an adapter unit of the household network side receives the Ethernet frame, storing the MAC address of the intelligent information appliance, encapsulating the Ethernet frame in a first computer bus message, and sending the encapsulated Ethernet frame to the computer bus main processing module;
b22, analyzing by the computer bus main processing module the first computer bus message, to determine whether a device is plugged into a port of the hub;
b23, sending by the computer bus main processing module a second computer bus message containing the unused computer bus address to the adapter unit; and
b24, storing by the adapter unit the unused computer bus address in the second computer bus message sent by the computer bus main processing module, encapsulating by the adapter unit the second computer bus message into an Ethernet frame, and sending by the adapter unit the Ethernet frame to the processing unit.

13. The method of claim 12, wherein between said b22 and said b23, the method further comprises:
b21', using by the computer bus main processing module the stored mapping list of hub ports and computer bus addresses to decide whether or not a computer bus address is allocated to the port into which the subordinate device is plugged; if allocated, then executing b22', otherwise executing said b23,
wherein said b22' includes sending by the computer bus main processing module the second computer bus message containing the computer bus address allocated to the port into which the subordinate device is plugged, to the adapter unit, then executing said b24.

14. The method of claim 10, wherein said b5 comprises:
b51, after an adapter unit at the household network side receives the acknowledgment message, storing the computer bus address and the intelligent information appliance's MAC address into a mapping list of computer bus addresses and MAC addresses, respectively; and
b52, sending by the adapter unit the acknowledgment message to the computer bus main processing module.

* * * * *